United States Patent
Bayer et al.

(10) Patent No.: US 11,126,934 B2
(45) Date of Patent: Sep. 21, 2021

(54) GROUP TRAVEL SYSTEM IN AN ONLINE MARKETPLACE

(71) Applicant: Airbnb, Inc., San Francisco, CA (US)

(72) Inventors: Lex Neal Bayer, Menlo, CA (US); James Joseph Beshara, San Francisco, CA (US); Jonathan Paul Golden, San Francisco, CA (US); Khaled A. Hussein, San Francisco, CA (US); Mai Leduc, San Francisco, CA (US); Gabriel Schuyler Westmaas, San Francisco, CA (US); Johann Kevin Nicolas Camille Max Kerbrat, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 816 days.

(21) Appl. No.: 15/692,076

(22) Filed: Aug. 31, 2017

(65) Prior Publication Data
US 2019/0066002 A1 Feb. 28, 2019

(51) Int. Cl.
*G06Q 10/02* (2012.01)
*G06Q 50/14* (2012.01)
(Continued)

(52) U.S. Cl.
CPC .......... *G06Q 10/025* (2013.01); *G06Q 30/02* (2013.01); *G06Q 30/0601* (2013.01); *G06Q 50/14* (2013.01)

(58) Field of Classification Search
CPC .. G06Q 10/025; G06Q 30/02; G06Q 30/0601; G06Q 50/14; G06Q 50/12
(Continued)

(56) References Cited

U.S. PATENT DOCUMENTS 8,700,436 B2 * 4/2014 Takahashi .............. G06Q 10/02
705/6
10,643,292 B1 * 5/2020 Gorman-Ladd ....... G06Q 50/01
(Continued)

FOREIGN PATENT DOCUMENTS

| WO | WO-2005017671 A2 * | 2/2005 | ........... G06Q 10/025 |
| WO | 2006111411 | 10/2006 | |
| WO | 2019045834 | 3/2019 | |

OTHER PUBLICATIONS

MetaFilter. "Group trip late cancellation etiquette". https://ask.metafilter.com/306742/Group-trip-late-cancellation-etiquette. Published Mar. 2017. (Year: 2017).*
(Continued)

*Primary Examiner* — George Chen
*Assistant Examiner* — Lisa Ma
(74) *Attorney, Agent, or Firm* — Schwegman Lundberg & Woessner, P.A.

(57) ABSTRACT

Systems and methods are provided for receiving from a first computing device associated with a first user, a request to register a group trip comprising at least one trip item, the request including parameters for the group trip, and receiving authorization from a second computing device associated with a second user to be included in the group trip. The systems and method further providing for receiving from the first computing device, a request to book a trip item for the group trip, approving the request to book the trip item for the group trip based on determining that the trip item meets the parameters for the group trip, and automatically charging a payment device associated with the first user and a payment device associated with the second user according to the parameters related to the group trip.

20 Claims, 9 Drawing Sheets

(51) Int. Cl.
  *G06Q 30/02* (2012.01)
  *G06Q 30/06* (2012.01)
(58) Field of Classification Search
  USPC ............................................................ 705/6
  See application file for complete search history.

(56) References Cited

U.S. PATENT DOCUMENTS

| | | | | |
|---|---|---|---|---|
| 2004/0148207 | A1 | 7/2004 | Smith et al. | |
| 2009/0216600 | A1* | 8/2009 | Hill ........................ | G06Q 50/30 |
| | | | | 705/7.14 |
| 2012/0018506 | A1* | 1/2012 | Hammad ................ | G06Q 30/06 |
| | | | | 235/375 |
| 2012/0109721 | A1* | 5/2012 | Cebon .................... | G06Q 30/06 |
| | | | | 705/13 |
| 2013/0054281 | A1* | 2/2013 | Thakkar ................. | G06Q 50/30 |
| | | | | 705/5 |
| 2013/0158869 | A1* | 6/2013 | Lerenc ............... | G01C 21/3438 |
| | | | | 701/527 |
| 2014/0297337 | A1* | 10/2014 | Geraci ................. | G06Q 10/025 |
| | | | | 705/5 |
| 2015/0163256 | A1* | 6/2015 | Frank ..................... | H04W 4/08 |
| | | | | 715/753 |
| 2016/0321566 | A1* | 11/2016 | Liu .................... | G01C 21/3438 |
| 2017/0186055 | A1* | 6/2017 | Silkey ............... | G06Q 30/0278 |
| 2019/0279317 | A1* | 9/2019 | Burton .................... | H04L 51/16 |
| 2020/0050976 | A1* | 2/2020 | Lowe .................. | G06Q 20/102 |

OTHER PUBLICATIONS

College Confidential. "Friend cancelled travel plans at last moment". https://talk.collegeconfidential.com/parent-cafe/1911552-venting-session-friend-cancelled-travel-plans-at-last-moment.html. Published Aug. 2016. (Year: 2016).*

Lopez, Napier. "Airbnb is adding split payments so your friends don't leave you hanging". Published Jun. 22, 2017. https://thenextweb.com/apps/2017/06/22/airbnb-is-adding-split-payments-so-your-friends-dont-leave-you-hanging/ (Year: 2017).*

"International Application Serial No. PCT US2018 038281, International Search Report dated Dec. 6, 2018", 2 pgs.

"International Application Serial No. PCT US2018 038281, Written Opinion dated Dec. 6, 2018", 4 pgs.

* cited by examiner

GROUP TRAVEL SYSTEM IN AN ONLINE MARKETPLACE

BACKGROUND

It is common for people to vacation together as a group, be it a group of friends, families meeting up in a city, or company employees staying together at a conference. Planning and paying for a vacation or travel expenses can be time consuming and expensive. This is especially so for group travel since the reservation is for many people. Also, the person making the booking usually ends up paying for everyone. Often that person has to later go to the individuals of the group and ask for repayment which might be collected through many different methods such as cash, checks, or electronic payments. In some cases this process can take many months as people "get busy" or "forget" and in some cases even never pay back the amounts. Yet others try and even out the expenses on the trip by paying for other things (groceries, tickets, gas, and so forth) and keep a ledger/account of what they are spending to even out the costs of what the original person spent on the accommodation. This process is cumbersome and less than desirable for the person making the booking on behalf of the group and might bias the booker to selecting accommodations that are cheaper to avoid paying so much upfront, or potentially not having a trip booked to avoid the hassle of the booking and dealing with the payments collection process.

This is further complicated by travel platforms that require payments upfront for the booking. This means that the person making the booking not only has to pay the amount on behalf of others, but front the money for potentially many months, only to collect it from the rest of the group after the trip occurs. For example, a booking is made and paid for in July for the December holidays. After the trip is concluded, the booker collects the payments from members of the group in January, meaning that they fronted the money to the rest of the group for six months.

Another complication is that on travel platforms such as home sharing websites, it is not always clear if a particular booking will be accepted and might require several attempts before a booking is confirmed. As such, the amount of payment that is required might adjust depending on which accommodation is ultimately booked.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
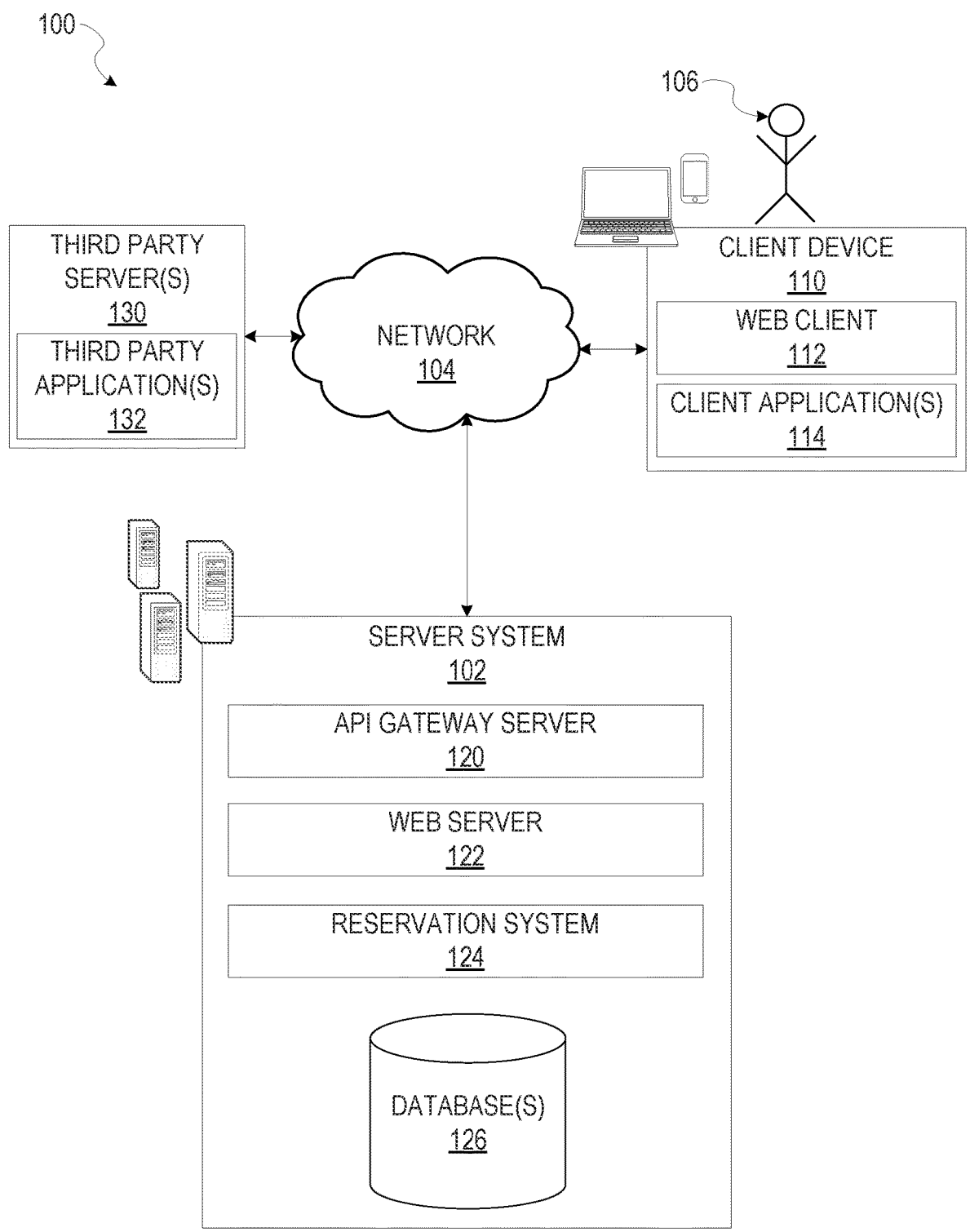
FIG. 1 is a block diagram illustrating a networked system, according to some example embodiments.

Systems and methods described herein relate to facilitating real-time (or near real-time) approval for individual members for group reservations and payments for a reservation via an online marketplace for travel (e.g., accommodations, flights, car rental, tours, and so forth). This allows individuals of a group of people to collectively make and pay for a booking on the online marketplace at the time of booking.

For example, an online marketplace receives a request from a first user to register a group trip comprising at least one trip item, the request including parameters for the group trip and the group comprising at least one other user. The online market place sends notification to the other users in the group for approval to be included in the group the trip. The other users in the group may respond with an authorization to be charged for a trip item based on the parameters of the group. The first user (or any of the users in the group) may then book a trip item via the online marketplace. The online marketplace receives the request to book the trip item and analyzes a listing associated with the trip item and the parameters related to the group trip to determine whether to approve the request. For example, the online marketplace approves the request to book the trip item based on determining that the listing for the trip item meets the parameters for the group trip. The online marketplace automatically charges a payment device associated with the first user and a payment device associated with each of the other users in the group, and sends a confirmation notification to each user in the group confirming booking of the trip item.

One technical challenge with reservations and payment for group travel is the sequencing of events for real time approval. In the offline world, one person would pay and then the group payments would have to be collected after the fact. There would be no way for a host (e.g., property owner, property manager person, accommodation owner, listing manager, etc.) to only accept a booking knowing instantaneously that all payments from the group were valid and would clear at the same time. If they assume they will and they do not, then they might lose out on another booking that could come in for those same dates. For example, if there is a group of five people paying for a group trip, the first four credit cards may be approved but the fifth may be declined, and then the entire reservation may be canceled since full payment was not received. So by having an online marketplace for travel that can, in real time, validate multiple payment methods to allow a host to make a decision to accept a group payment for a booking (or not) is a sequence of events that cannot happen without a unique technology and platform to facilitate it.

For example, typical solutions allowing for group payments either involve pre-payment or post-payment solutions. An example of post payment solutions are systems that attempt to make it easy to collect payments from people after the purchase. An example is PayPal or Venmo, which allow a user to request money from another person who can then electronically send the money to the user if they have an online account. If they do not have an existing account, then they need to set up such an account before transferring the money.

In the pre-payment model, a person collects the money from a group ahead of the purchase, and the purchase can proceed only if the money is collected. Examples include crowdfunding websites such as Kickstarter, Tilt, and Indiegogo. With this method, the person needs to know upfront what the total amount is that is needed to make the purchase/booking reservation. As an example, the user who is organizing the trip may think the vacation will cost $1000, and will only go and try and book the vacation for that amount once the $1000 is collected. If the total is less, the organizer needs to find a way to reimburse the members of the group for the difference.

Another technical challenge is determining a trustworthiness of a particular user of a group. For example, determining whether the user of the group will pay the amount owed, whether the user of the group is someone the other users can trust to stay with them in a particular accommodation or join them on a particular activity, and so forth. Example embodiments allow for the online system to verify that a particular user is trustworthy based on verifying an identification of the user (e.g., via government issued identification, social networking identification, payment information, etc.), validated payment credentials for the user (e.g., payment device information, validating the user has the money to pay for the trip, validating the user has already paid for the trip, etc.), based on other users' reviews of the user, and so forth. For example, there may be specific requirements for the user to be eligible for group trips and group payments by verifying the user (e.g., determining the user is a trustworthy user). The user may be verified by having a verified identification (e.g., government issued identification, such as driver's license, passport, etc.) with the server computing system, the user having received positive reviews from at least one other user (e.g., host or manager of a listing, or other user), the user having a verified payment device or method with the server computing system, and so forth.

Yet another technical challenge is handling reservation cancelations by one or more users of a group for a group trip or trip item. In an online marketplace with millions of listings for trip items with individually set cancelation policies (e.g., a first manager of a first listing may set a cancelation policy that is different than a second manager's cancelation policy for a second listing) and millions of users that may want to set particular parameters for a group trip, it is technically challenging to determine how to satisfy varying cancelation policies of trip items and users and ensure that a trip item or entire group trip is not canceled unnecessarily. For example, if one guest out of a group of ten guests cancels, should the manager of the listing cancel the entire group, keep the reservation and charge the remaining guests, and how does the manager of the listing collect the additional payments?

Another technical challenge is how to manage requests from one or more users who want to alter aspects of a reservation of a trip item or alter parameters for a group trip and how to address whether this cancels the trip or is acceptable to other uses of the group, and so forth.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive reservation information, accommodation information, and so forth, associated with individual or group travel.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alpha-numeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access reservation information or listing information, to request data, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

The system 100 may further include one or more third party servers 130. The one or more third party servers 130 may include one or more third party application(s) 132. The one or more third party application(s) 132, executing on third party server(s) 130, may interact with the server system 102 via Application Programming Interface API gateway server 120 via a programmatic interface provided by the API gateway server 120. For example, one or more the third party applications 132 may request and utilize information from the server system 102 via the API gateway server 120 to support one or more features or functions on a website hosted by the third party or an application hosted by the third party. The third party website or application 132, for example, may provide various functionality that is supported by relevant functionality and data in the server system 102.

A server system 102 may provide server-side functionality via the network 104 (e.g., the Internet or wide area network (WAN)) to one or more third party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listings for trip items, such as accommodations hosted by various managers which can be reserved by clients, such as for an apartment, a house, a cabin, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted and the manager receives no revenue. The online marketplace may further provide listings for other trip items, such as experiences (e.g., local tours), car rental, flights, public transportation, and other transportation or activities related to travel.

The server system 102 may include an API gateway server 120, a web server 122, and a reservation system 124, that may be communicatively coupled with one or more databases 126 or other form of data stores.

The one or more databases 126 may be one or more storage devices that store data related to a reservation system 124 and other systems or data. The one or more databases 126 may further store information related to third party servers 130, third party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The reservation system 124 may manage resources and provide back-end support for third party servers 130, third party applications 132, client applications 114, and so forth, which may include cloud-based applications. The reservation system 124 may provide functionality for viewing listings related to trip items (e.g., accommodation listings, activity listings, etc.), managing listings, booking listings and other reservation functionality, and so forth, for an online marketplace. Further details related to the reservation system 124 are shown in FIG. 2.

Figure 2:
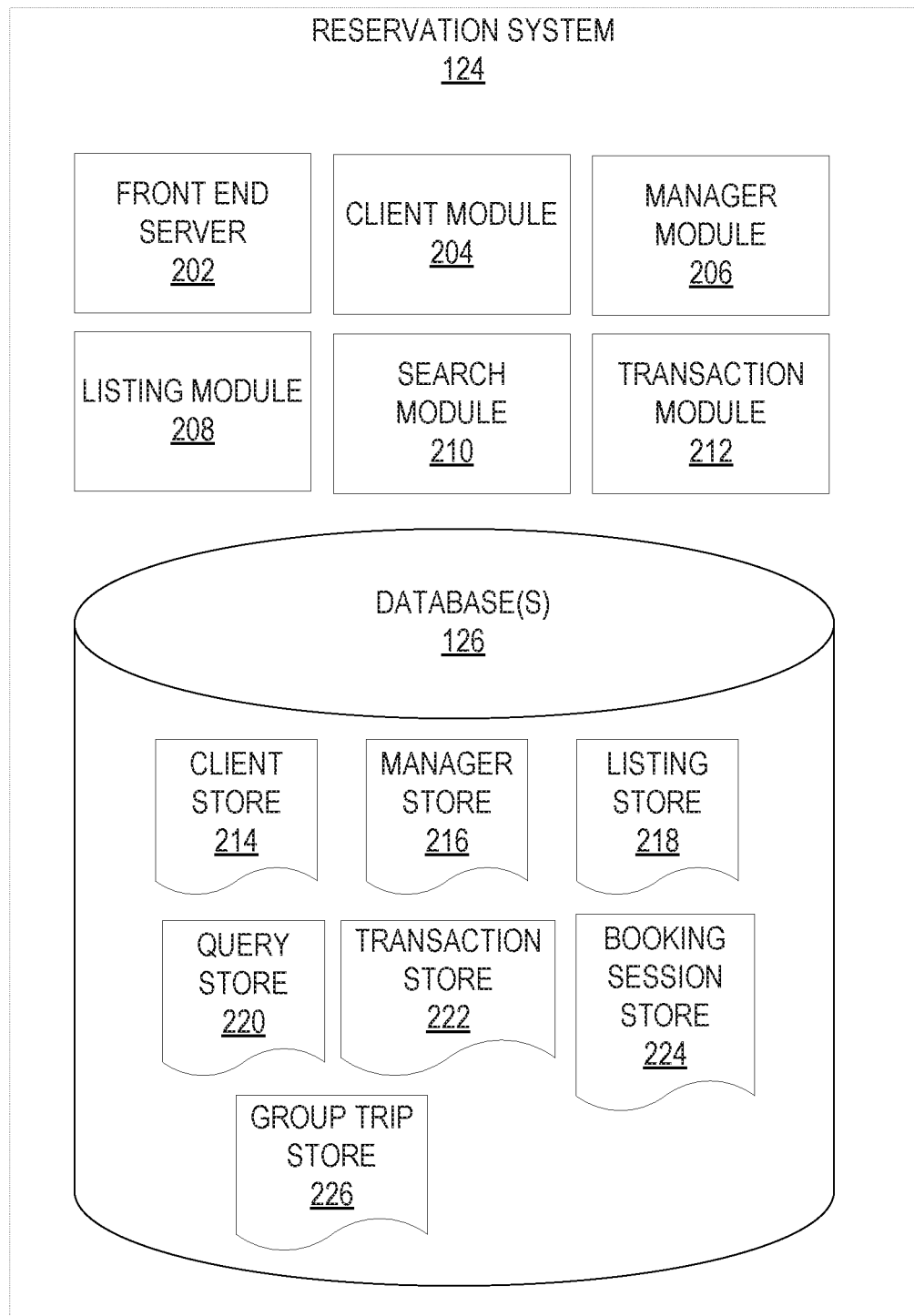
FIG. 2 is a block diagram illustrating a reservation system, according to some example embodiments.

FIG. 2 is a block diagram illustrating a reservation system 124, according to some example embodiments. The reservation system 124 comprises a front end server 202, a client module 204, a manager module 206, a listing module 208, a search module 210, and a transaction module 212. The one or more database(s) 126 include a client store 214, a manager store 216, a listing store 218, a query store 220, a transaction store 222, a booking session store 224, and a group trip store 226. The reservation system 124 may also contain different and/or other modules that are not described herein.

The reservation system 124 may be implemented using a single computing device or network of computing devices, including cloud-based computer implementations. The computing devices may be server class computers including one or more high-performance computer processors and random access memory, which may run an operating system such as LINUX or the like. The operations of the reservation system 124 may be controlled through either hardware or through computer programs installed in non-transitory computer readable storage devices such as solid-state devices or magnetic storage devices and executed by the processors to perform the functions described herein.

The front end server 202 includes program code that allows client and manager client devices 110 to communicate with the reservation system 124. The front end server 202 may utilize the API gateway server 120 and/or the web server 122 shown in FIG. 1. The front end server 202 may include a web server hosting one or more websites accessible via a hypertext transfer protocol (HTTP), such that user agents, such as a web browser software application, may be installed on the client devices 110 and can send commands and receive data from the reservation system 124. The front and server 202 may also utilize the API gateway server 120 that allows software applications installed on client devices 110 to call to the API to send commands and receive data from the reservation system 124. The front end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124, and executes processing logic for client related information that may be requested by other components of the reservation system 124. Each client is represented in the reservation system 124 by an individual client object having a unique client ID and client profile, both which are stored in the client store 214.

The client profile includes a number of client related attribute fields that may include a profile picture and/or other identifying information, a geographical location, a client calendar, and so forth. The client's geographic location is either a client's current location (e.g., based on information provided by the client device 110), or their manually entered home address, neighborhood, city, state, or country of residence. The client location may be used to filter search criteria for time-expiring inventory relevant to a particular client or assign default language preferences. The client attributes or features are further described below.

The client module 204 provides code for clients to set up and modify the client profile. The reservation system 124 allows each client to communicate with multiple managers.

The reservation system 124 allows a client to exchange communications, request transactions, and perform transactions with managers.

The manager module 206 comprises program code that provides a user interface that allows managers (also referred to herein as "hosts" or "owners") to manage their interactions and listings with the reservation system 124 and executes processing logic for manager related information that may be requested by other components of the reservation system 124. Each manager is represented in the reservation system 124 by an individual manager object having a unique manager ID and manager profile, both of which are stored in manager store 216.

The manager profile is associated with one or more listings owned or managed by the manager, and includes a number of manager attributes including transaction requests and a set of listing calendars for each of the listings managed by the manager. The client attributes or features are further described below.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered, a timeframe of its availability including one or more of the start date, and dates, start time, and an end time, a price, a geographic location, images and description that characterize the inventory, and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per day, per month, and/or per season, or other interval of time specified by the manager. Additionally, price may include additional charges such as cleaning fees, pet fees, service fees, and taxes, or the listing price may be listed separately from additional charges. The listing attributes or features are further described below.

Each listing is represented in the reservation system 124 by a listing object, which includes the listings information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, minimum or maximum people allowed for the inventory, etc.). Information from each listing calendar is stored in the listing store 218.

The search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as formal requests) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that the agreeable terms are reached between the manager and the client. Modifications to a received request may include, for example, changing the date, price, or time/date range (and thus, effectively, which time-expiring inventories is being transacted for). The standardized forms may require the client to record the start time/date, duration (or end times), or any other details that must be included for an acceptance to be binding without further communication.

The transaction module 212 receives the filled out form from the client and presents the completed request form including the booking parameters to the manager associated with the listing. The manager may accept the request, reject the request, or provide a proposed alternative that modifies one or more of the parameters. The manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other models not specifically described herein allow the client to complete payment and for the manager to receive payment.

The transaction module 212 may further comprise code configured to enable clients to request and be approved for group trips, including group payments for a group trip. This may include storing client or user parameters related to the group trip or trip items in the group trip store 226, accessing the group trip store 226 to determine the parameters for the group trip, determining whether a listing associated with a trip item meets the parameters for the group trip, performing payment transactions for group trips, and so forth.

The transaction store 222 stores request made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request is comprised of a value indicating acceptance or denial and a timestamp. Other models may allow for instant booking, as described below.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing, the transaction, viewing data that was recorded for the booking session, and so forth, to be stored in the booking session store 224. The transaction module 212 may utilize other modules or data stores to generate booking session data to be stored in the booking session store 224.

Figure 3:
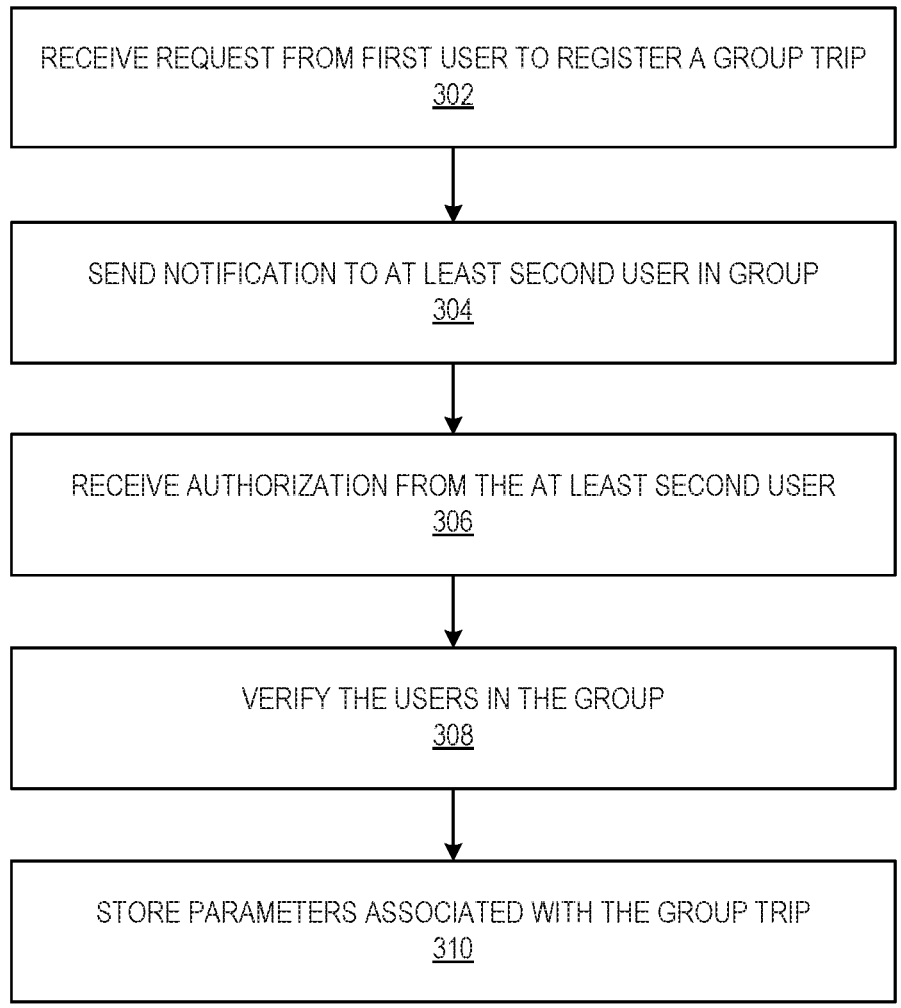
FIG. 3 is a flow chart illustrating aspects of a method for processing a request to register a group trip, according to some example embodiments.

FIG. 3 is a flow chart illustrating aspects of a method 300 for processing a request to register a group trip, according to some example embodiments. For illustrative purposes, method 300 is described with respect to the networked system 100 of FIG. 1 and FIG. 2. It is to be understood that method 300 may be practiced with other system configurations in other embodiments.

In operation 302, a server computing system (e.g., server system 102 and/or reservation system 124) receives a request to register a group trip from a computing device (e.g., client device 110) associated with a first user. A group associated with the group trip may comprise a plurality of users (e.g., 2, 5, 10, 25, etc.). For example, the group may comprise a first user and at least a second user. The group trip may comprise one or more trip items. For example, a trip item may include accommodations, flights, ground transportation, tours or other activities, and so forth. The request may further include one or more parameters for the group trip.

For example, a group of two people, traveler A and traveler B, would like to travel together on a trip to Paris. Traveler A may search for a place to stay in Paris via an online marketplace. For example, the online marketplace may provide a user interface via a computing device (e.g., via a local application or web-based interface on the computing device) that allows traveler A to search for listings of accommodations, view listings, communicate with hosts of listings, book listings, and so forth. The user interface may further provide the ability for traveler A to request a group trip and group payment for the trip (or trip item).

Figure 7:
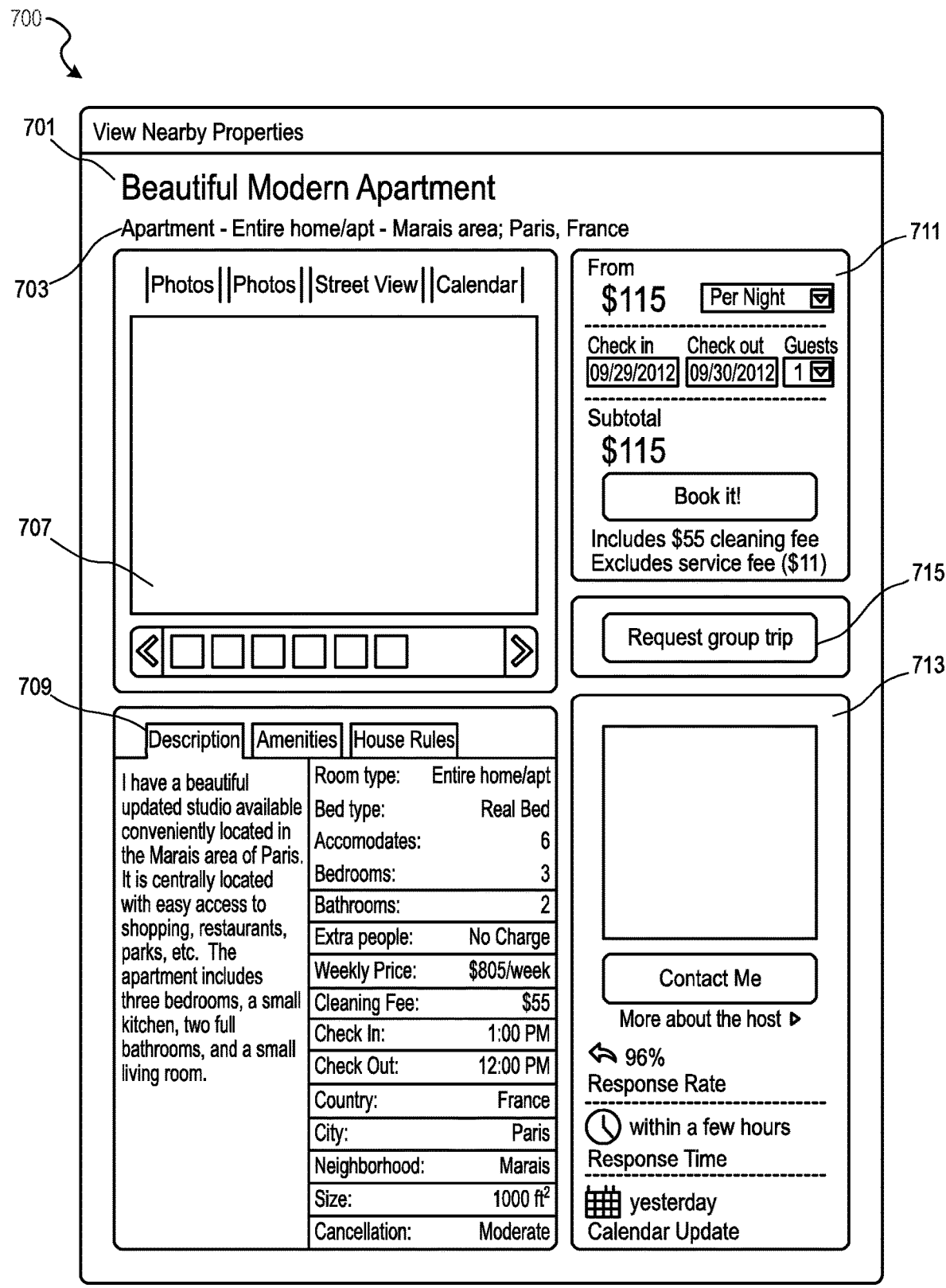
FIG. 7 is an example user interface for viewing details of a listing for a trip item, according to some example embodiments.

FIG. 7 illustrates an example user interface 700 for a description of a listing for a trip item (e.g., an apartment in Paris) in an online marketplace. The example listing shown in FIG. 7 is for accommodations in Paris. In other examples, the listing could be for a tour, local experience, transportation, or other trip item. The listing may include a title 701 and a brief description 703 of the trip item. The listing may further include photos of the trip item, maps of the area or location associated with the trip item, street view of the trip item, calendar of the trip item, and so forth, which may be viewed in area 707. The listing may include a detailed description 709, pricing information 711, and the listing host's information 713. The listing may further include an option to request a group trip 715.

The user may select the group trip option 715, specify various parameters associated with the group trip (or trip item), and provide contact information (e.g., name, email address, phone number, address, etc.) for traveler B (or any other users that will be part of the group trip). In one example, traveler A may provide the email address for traveler B.

In one example, parameters may include a date range of travel for the trip, a maximum amount for a trip item or for the group trip, a maximum amount per night, a total maximum amount per person for a trip item, a maximum amount per person per night, an amount of split for cost for each user, a minimum number of rooms in an accommodation, specified amenities for the trip item, and so forth. For example, traveler A may specify January 15 to January 30 for the trip, a maximum of $150 per night per person, two bedrooms, and that the reservation will be split 50% for each user (e.g., 50% by traveler A and 50% by traveler B).

The computing device sends the request to the server computing system (e.g., to reservation system 124 via an API gateway server 120 or web server 122). In one example, the server computing system may verify that the user (e.g., the first user) is eligible for group trips and group payments. For example, there may be specific requirements for the user to be eligible for group trips and group payments by verifying the user (e.g., determining the user is a trustworthy user). The user may be verified by having a verified identification (e.g., government issued identification, such as driver's license, passport, etc.) with the server computing system, the user having received positive reviews from at least one other user (e.g., host or manager of a listing, or other user), the user having a verified payment device or method with the server computing system, and so forth.

After receiving the request to register a group trip from the computing device, the server computing system sends a notification to the other users in the group that were specified in the request to register a group trip for approval to be included in the group trip, as shown in operation 304. For example, the server computing system may send an email or other message to a computing device associated with the user (e.g., second user or traveler B) requesting approval to be included in the group trip. The notification may include the parameters of the group trip or trip item and request that the user authorize a transaction that falls into those parameters. The server computing system may further request the user to provide a payment device or method (e.g., credit card, debit card, money order, electronic check or other electronic payment, or other payment instrument) to be stored in the server computing system so that it can be charged at the time of a future transaction for the group trip.

In operation 306, the server computing system receives authorization from a computing device associated with the second user to be included in the group trip. The authorization may include information about the user, payment device information (e.g., payment device identifier and related information), and so forth.

In one example, the authorization may also include alteration to the parameters by the second user. In another example, the alteration parameters may be separate from the authorization (e.g., the second user may authorize being included in the group trip and then make an alteration to the parameters at the same time or later). For example, the second user may want to alter the dates, the maximum amount paid, the number of rooms, and so forth. In this example, the server computing system would send a request for approval of the alteration(s) to the computing device associated with the first user (or other users in the group). The first user may approve or deny the alteration. If the first user approves the alteration(s), the server computing system may send a notification to the computing device associated with the second user confirming the alteration to the parameters. The alteration to the parameters (e.g., the updated parameters) are then stored as the parameters associated with the group trip described below in operation 310.

In operation 308, the server computing system may verify the users in the group trip as trustworthy users, as explained above. If one or more of the users are already part of the online marketplace, the server computer system may verify the users by simply confirming they are already part of the online marketplace (e.g., via a user name and login, or other user identifier) and have been previously verified, and may confirm they have already provided a payment device. Notification may be sent to the computing device associated with first user (and a computing device associated with each of the other users in the group) that the other users in the group have been verified. This may be particularly useful when the other users in the group are not known, or very well known, to the first user (or other users) in the group.

In operation 310, the server computing system stores the parameters associated with the group trip in one or more databases 126 (e.g., in group trip store 226). The server computing system may further store any user information for use in processing reservations, transactions, and so forth, for the group trip. The server computing system may send a notification to the computing device associated with the first user that the second user has agreed to be part of the group trip. For example, the server computing system may send a message to a computing device associated with traveler A confirming that traveler B has agreed to authorize transactions associated with the group trip.

The users in the group may now search for and reserve trip items for the group trip. In one example, one user is designated as the lead and is the only one who can book a trip item. In another example, any of the users may book a trip item, or more than one user may be designated to book a trip item. Embodiments described herein allow one or more users the ability to book a reservation and charge payment devices associated with multiple users in a group within the parameters authorized by the group.

Figure 4:
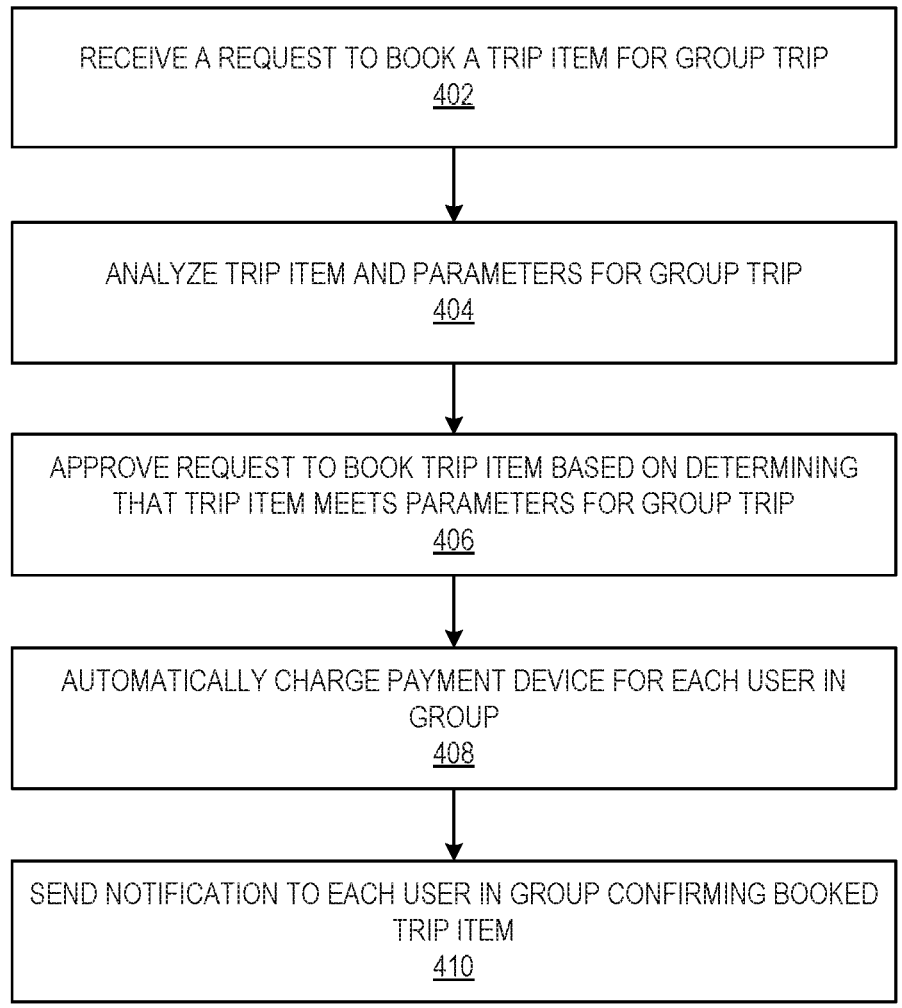
FIG. 4 is a flow chart illustrating aspects of a method for processing a reservation and transaction for a group trip item, according to some example embodiments.

FIG. 4 is a flow chart illustrating aspects of a method 400 for processing a reservation and transaction for a group trip item, according to some example embodiments. For illustrative purposes, method 400 is described with respect to the networked system 100 of FIG. 1 and FIG. 2. It is to be understood that method 400 may be practiced with other system configurations in other embodiments.

In operation 402, the server computing system receives a request to book a trip item for the group trip. For example, a first user (or the second user or other user) associated with a group trip may search for accommodations in the online marketplace and find a place within the parameters of the group trip. For example, the listing for the accommodation may be in the Marais area in Paris, is $115 per person per night, has two bedrooms, and is available for five nights starting on January $20^{th}$ for a total of $1,150. The first user may (e.g., via a user interface on a computing device as explained above) select the listing to book the listing. The computing device may send a request to book the trip item (e.g., the trip item in the listing) to the server computing system (e.g., to reservation system 124 via an API gateway server 120 or web server 122). The request may include information associated with the listing for the trip item, the reservation details (e.g., dates, amount, etc.), user information, and any other information to process the registration request.

Once the server computing system receives the request to book the trip for the group item, it determines the information to process the request (e.g., trip item listing, reservation detail, group trip parameters, etc.) based on the information in the request. In operation 404, the server computing system analyzes the trip item and the parameters related to the group trip to determine whether to approve the request. In one example, the server computing system may analyze a listing associated with the trip item and the parameters related to the group trip to determine whether to approve the request. For example, the server computing system may access the listing store 218 to determine the details of the listing associated with the trip item and then access the group trip store 226 to determine the parameters of the group trip. The server computing system may then compare the parameters of the group trip to the details in the listing to determine whether or not the listing meets the requirements in the parameters. For example, the server computing system may compare the date range, maximum cost per night per person, total cost of the reservation, location of the trip item, and so forth, to the parameters to be sure they each fall within the parameters for the group trip.

If the listing for the trip item does not fall within the parameters of the group trip, the server computing system will deny the request. The server computing system may then send a notification to the computing device associated with the user (and optionally computing devices associated with other users in the group) to notify the user that the reservation would not meet the parameters of the group trip so that the user may then modify the reservation to meet the parameters or request a reservation for another listing that does fall into the parameters for the group trip.

In operation 406, the server computing system approves the request to book the trip item for the group trip based on determining that the listing for the trip item meets the parameters for the group trip. This may happen in near-real time from when the user sent the request to book the trip item. For example, the user may select "confirm reservation" in a user interface for an online marketplace and then almost instantly receive a confirmation that the trip item is booked and approved for the group trip (or denied because it does not meet the parameters of the group trip).

In operation 408, upon approving the request to book the trip item, the server computing system automatically charges a payment device for each user in the group according to the parameters related to the group trip. For example, the server computing system would automatically charge the first user for 50% percent of the total amount and the second user 50% of the total amount. In the Paris example above, traveler A would be charged $575 and traveler B would be charged $575. In this way the booking is paid for by the group at the time of booking, versus an individual of the group at the time of booking. Accordingly, example embodiments described herein allow for a group of people to collectively make and pay for a booking on a travel platform at the time of booking. Example embodiments facilitate a collection and approval of multiple parties (e.g. a group) to a transaction and assign the members to a single booking transaction.

To automatically charge the payment device, the server computer system may utilize a payment processor or payment card network to process the payment and charge the payment device. For example, the server computing system may send an authorization request including transaction details (e.g., user name, payment device details (e.g., payment device identifier, expiration date (e.g., if a credit card or debit card), billing address, etc.) to a payment processor (e.g., to a computing device such as a server computer associated with a payment processor). The payment processor forward the authorization request to the issuer of the payment device (e.g., to a computing device such as a server computer associated with the issuer) to be authorized. The server computer associated with the issuer of the payment device approves or denies the transaction (e.g., based on the payment device status and whether the transaction is within a particular limit, etc.). The server computer associated with the issuer of the payment device sends an authorization response message to the server computer associated with the payment processor indicating whether the transaction is approved or denied. The server computer associated with the payment processor sends the authorization response to the server computer system. The server computer system may provide a confirmation to the user computing device that the transaction was approved or denied. If the transaction was denied the server computer system may request another form of payment (e.g., another payment device) to proceed with the transaction.

In operation 410, the server computing system sends a confirmation notification to each computing device associated with each user in the group to confirm booking of the trip item. The notification may include the details of the trip, including the itinerary, accommodation details, host/property owner details, and so forth.

Example embodiments can work for groups of n size, and with x people for how to split the payments. In one example, a group of five people may comprise two couples and one individual. Example embodiments allow for a member of the couple to agree to pay for the couple together, or only as an individual. So for example, a member of the first couple agrees to pay the charges for both members of the couple (e.g., 2/5=40%), the second couple has each member agree to pay for their own portion (e.g., 2×1/5=2×20%=40%), and the individual agrees to pay for his/her portion too (1/5=20%). At the time of the booking, when a person in the group makes the booking, each portion of the group will be charged based on the pre-set proportions agreed to (in this case, 40%, 20%, 20% and 20%). In this way, when a party of the group gets notified about an upcoming trip, it specifies what portion he/she will be responsible for and has the option to take over the responsibility of another party (in this example, for a member of the couple).

In one example, the user that initiates the formation of the group is designated as the only person who can complete the booking. In another example, any member of the group can book on behalf of the entire group. In yet another example, once a member of the group finds an appropriate accommodation, each member is sent a notification about the listing and has to approve that specific accommodation, and only once the group approves will the platform attempt to book the reservation by charging each member's payment device on file.

In one example, the parameters specified by the user initiating the group trip includes date ranges for the trip, or specific dates, a maximum per person per day amount to be spent, a location for the booking, the number of members necessary for the group to constitute being complete, and so forth. Additional parameters may include the ability to set the portions that each member will pay, the number of bedrooms, or types of bedrooms each member will be entitled to as part of the booking (e.g., private bedroom, or shared space). As an example, the person initiating a group trip of two members can specify that he/she pays 60% and the other person only pays 40%.

In another example, a group is formed and a member is designated as having permission to book on behalf of others (e.g., designated as the leader). The other members of the group consent to the leader making the booking and put their payment devices on file. No additional parameters (or minimal total spending limits) are specified and the leader has the ability to make the booking. For example, a group of five college students want to travel together. Kim initiates the group and is designated as the leader. Each other member of the group is notified that Kim requests to book on their behalf for the group of five and adds their credit card. Kim then has the ability to complete a booking for the trip and the other members will be charged at the time of the booking in the appropriate equal split of the group.

In another example, the user initiating the group adds group members at the time of finding an appropriate accommodation. The members of the group are then notified to approve the specific accommodation selected according to his/her proportion. Once 100% of the group allocation is approved, the platform makes the booking reservation and charges the various members. If the original trip item (e.g., property, tour, etc.) is not booked, then the payment devices remain on file and the user can find another trip item (e.g., accommodation) to book and repeat the process with the group for the alternate trip item.

With group booking, each member of the group who pays is considered a member of the reservation and will be able to add a review to the trip item (e.g., accommodation) or communicate (e.g., via message, chat, phone, etc.) with the host/owner (e.g., accommodation host). Similarly, the review by the host/owner will be associated with all members of the group and be included in their user reviews. Information as part of the group will also specify who is part of the group by displaying the members' profiles, as well as various status such as if they have approved being included in the group or added their payment device on file. When payment devices are added on file, the platform can perform various checks to ensure the validity of the cards ("$0 authorization," address checks, etc.). In this way, a payment device may also be a form of identification verification. If, during a booking, the payment device of one member fails, the platform can cancel the reservation and refund any payment devices already charged. Alternatively, the platform can provide the member whose payment device failed with a specified time to cure the problem (e.g., 24 hours) by adding an additional payment device or method and then try again.

Figure 5:
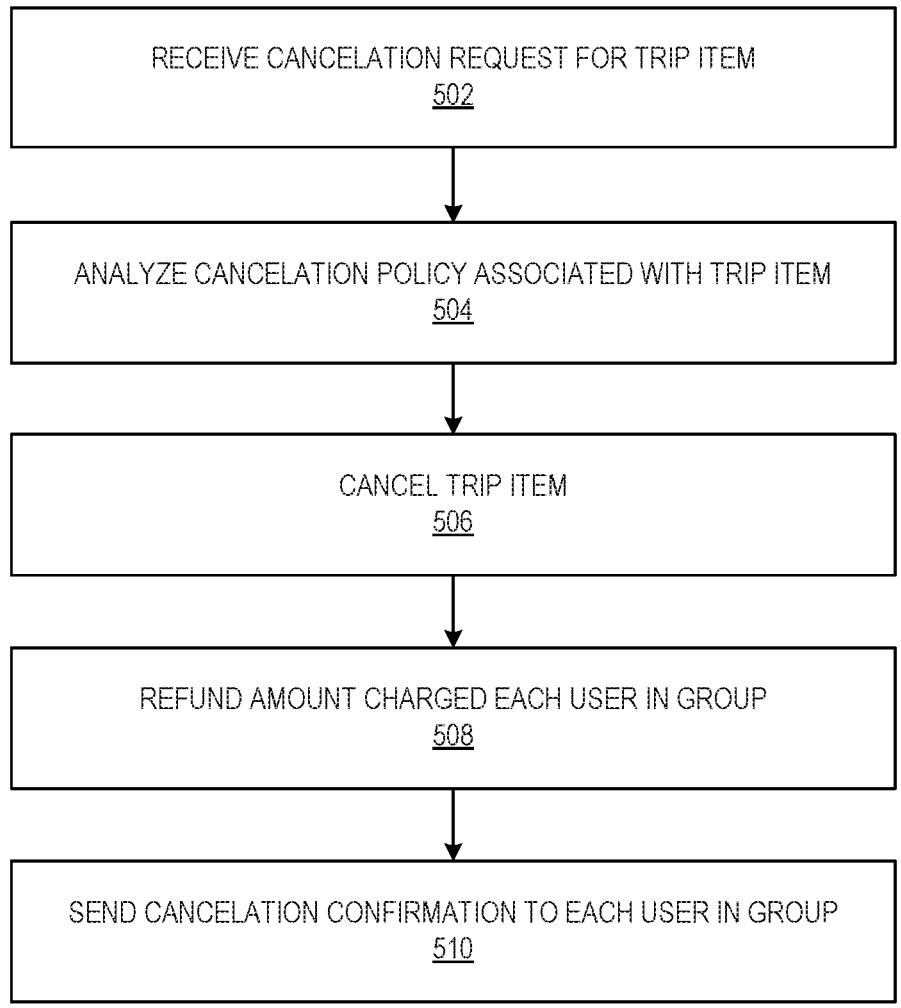
FIG. 5 is a flow chart illustrating aspects of a method for processing a cancelation for a group trip item, according to some example embodiments.

Should the reservation or booking be canceled or altered in the future, the payments may be refunded to each party in proportion to the payment or, if charges are added, then the additional amounts may be split between the parties in the same proportion. For example, a cancelation or alteration may be made by a manager of a listing, one or more users, or both. FIG. 5 is a flow chart illustrating aspects of a method 500 for processing a cancelation for a group trip item, according to some example embodiments. For illustrative purposes, method 500 is described with respect to the networked system 100 of FIG. 1 and FIG. 2. It is to be understood that method 500 may be practiced with other system configurations in other embodiments.

In operation 502, the server computing system receives a cancelation request from a computing device associated with a user to cancel a trip item associated with a group trip. For example, one of the users of the group may cancel a trip via a computing device using a user interface to an online marketplace, as explained above. The computing device may send the cancelation request to the server computing system (e.g., to reservation system 124 via an API gateway server 120 or web server 122). The cancelation request may include information about the trip item, user, and other relevant information.

At operation 504, the server computing system analyzes the cancelation policy associated with the trip item. For example, the server computing system may analyze the listing for the trip item to determine whether the trip item may be canceled. For example, the online market place may have millions of listings for trip items and each trip item may have a different cancelation policy. For example, one trip item may have a cancelation policy for a full refund if canceled within 30 days before the beginning date of the trip item, but no refund if after 30 days. Another trip item may have a cancelation policy for a full refund if canceled within 30 days before the beginning date of the trip item, 50% refund if canceled within 14 days before the beginning date of the trip item, and no refund if canceled less than 14 days before the beginning of the trip item. Yet another trip item may have a full refund cancelation policy just as long as the user cancels the reservation 24 hours before the beginning date of the trip item. Accordingly, trip items may have any combination of these or other cancelation policies. The server computer system may access the listing details for the trip item in the listing store 218 to determine the cancelation policy. The server computer system may then determine whether the cancelation request may be approved by determining if the information associated with the cancelation request (e.g., date of cancelation request, number of days before beginning date of trip item, etc.) falls within the cancelation policy of the listing of the trip item or not.

If the server computing system determines that the reservation for the trip item may be canceled, the server computing system cancels the reservation for the trip item, as shown in operation 506. In operation 508, the server computing system automatically refunds the amount charged to each user in the group, based on parameters for the group trip. The server computing system may utilize a payment processor to automatically refund the amount charged each user in the group.

In one example, before canceling the trip item, the server computing system may send a notification to each computing device associated with each of the other users in the group requesting approval from each user to cancel the trip. In this example, the server computing device only cancels the trip item if it receives approval from each computing device associated with each other user in the group. The server computing system may request that approval be given or denied within a predetermined time period (e.g., 24 hours) or the trip item will be canceled.

In operation 510, the server computing system sends a cancelation confirmation to each computing device associated with each user in the group.

One or more users of a group trip may also want to alter a reservation for one or more trip items in a group trip. For example, a user may want to change the date of the reservation, add an additional night to the reservation, remove a night from the reservation, and so forth. To do so, the user may send an alteration request to the server computing system via a computing device using a user interface to an online marketplace, as explained above. The computing device may send the alteration request to the server computing system (e.g., to reservation system 124 via an API gateway server 120 or web server 122). The alteration request may include information related to the trip item, the information for the alteration, user information, and so forth.

The server computing system may send a notification to each computing device associated with each of the other users in the group trip to solicit approval from each user in the group (e.g., each paying member) for the alteration. The server computing system may request that approval be given or denied within a predetermined time period (e.g., 24 hours) or the alteration request will be denied. If the server computing system receives approval for the alteration request from the other users, the server computing system charges (or refunds) each user of the group trip appropriately according to the parameters of the group trip.

Figure 6:
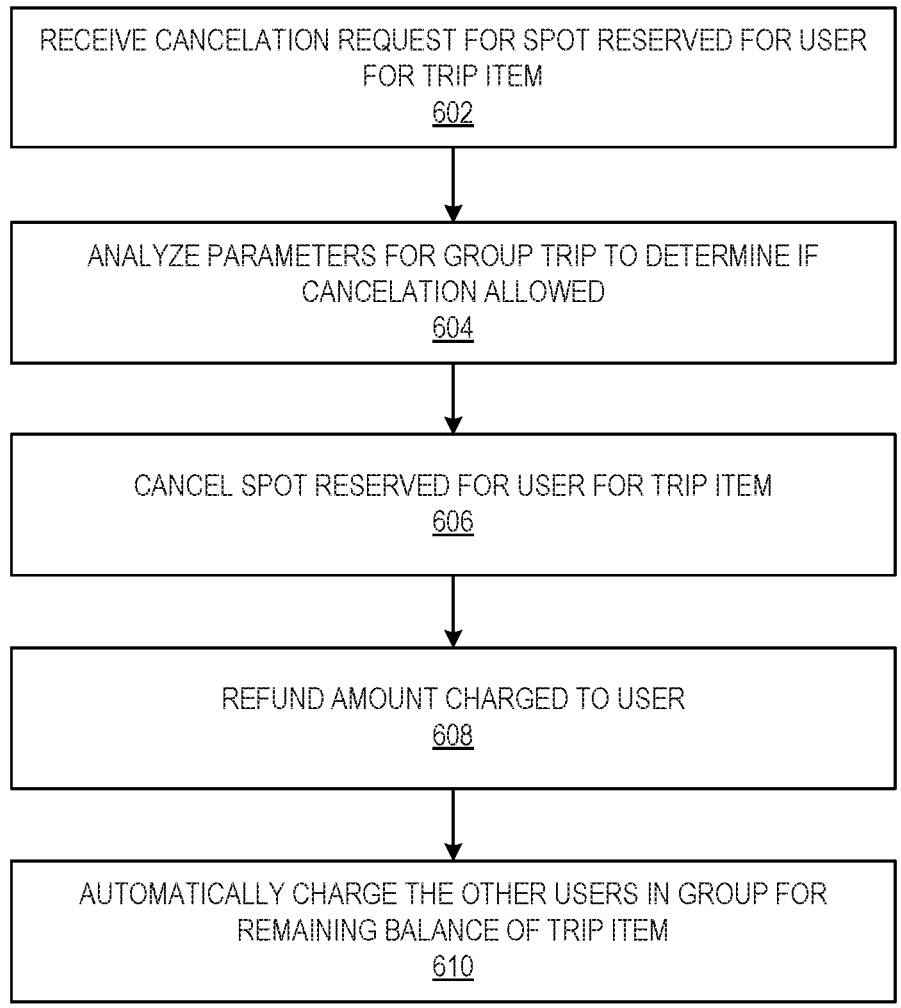
FIG. 6 is a flow chart illustrating aspects of a method for processing a cancelation for a user's spot in a trip item for a group trip, according to some example embodiments.

In one example, a user may want to leave a group but not cause the entire group trip to be canceled. For example, a first user in a group of five users may want to cancel the spot reserved for the first user in a trip item for a house in Paris. FIG. 6 is a flow chart illustrating aspects of a method 600 for processing a cancelation for a user's spot in a trip item for a group trip, according to some example embodiments. For illustrative purposes, method 600 is described with respect to the networked system 100 of FIG. 1 and FIG. 2. It is to be understood that method 600 may be practiced with other system configurations in other embodiments.

In operation 602, the server computing system receives a cancelation request from a computing device associated with a user of a group trip to cancel a spot reserved for the trip item for only the user. For example, the user may send the cancelation request via a computing device using a user interface to an online marketplace, as explained above. The computing device may send the cancelation request to the server computing system (e.g., to reservation system 124 via an API gateway server 120 or web server 122).

In operation 604, the server computing system analyzes the parameters for the group trip to determine the cancelation policy for the group trip. For example, the parameters may allow an individual to cancel without canceling the whole trip and may specify how to allocate the remaining balance after the individual cancels. In another example, the parameters may not allow an individual to cancel and instead may specify that the entire trip item be canceled if one individual cancels. In yet another example, the parameters may specify that each of the other users be notified and may approve or deny such a cancelation request. In another example, the parameters may specify a minimum number of users for the trip item and if the user canceling causes the number of users to drop below the minimum, then the trip is canceled, and so forth.

In one example, the server computing system may send a notification to each computing device associated with each of the other users in the group trip to solicit approval from each user in the group (e.g., each paying member) for the cancelation. The server computing system may request that approval be given or denied within a predetermined time period (e.g., 24 hours) or the cancelation request will be denied.

If the server computing system determines that the cancelation request does not comply with the parameters for the group trip, the cancelation request will be denied. If the server computing system determines that the cancelation request is allowed based on the parameters (and, optionally, approval from each of the other users), the server computing system cancels the spot reserved for the user for the trip item, in operation 606, and refunds the amount charged to the user, in operation 608. In operation 610, the server computing system automatically charges the remaining balance for the trip item to the other users remaining in the group, according to the parameters for the group trip. The server computing system may utilize a payment processor to refund and/or charge the users, as explained above. The server computing system may send notification to each computing device associated with each of the users confirming that the first user's spot for the trip item has been canceled.

In one example, a group for a group trip may be an open group or a closed group. For example, a closed group may be a group of users that decide to book a trip together and does not include the ability for others unknown to the group to join at any time. In one example, users A, B, and C decide to book accommodations in San Francisco for a trip together via the online marketplace. A user D of the online marketplace, who is unknown to users A, B, or C, would not be able to access or join the group trip without user A, B, or C explicitly inviting user D.

An open group may be a group that is established that will allow up to a certain number of users to join the group trip before a certain deadline. For example, a user may reserve accommodations for ten people and the payment for the accommodation may be due in 30 days, after which the reservation will be canceled if the payment is not received. The user may specify users to invite to stay in the accommodation, and/or any user of the online marketplace may be able to access the group trip and request to be added to the group. In another example, a user may reserve a tour for fifteen people and may specify users to invite to go on the tour, and/or any user of the online marketplace may be able to access the group trip and request to be added to the group. The user who initiates the reservation for the trip item (or other users in the group) may specify that a user must be verified in order to join the group (e.g., via verified identification, positive reviews from other guests or hosts, or other means, as explained above), a minimum number of users for the group trip to go forward, or other parameters for the group trip.

In another example, users in the group for the group trip may join the group trip or one or more trip items for different lengths of time. For example, users A, B, C, and D may be part of a group for a group trip to Nicaragua. The group trip may include accommodations on an island in Nicaragua for ten days. Users A, B, and C may be staying in the accommodations for the entire ten days, but user D may only be staying in the accommodations for seven days. In another example, users A and B may be staying the first five days, and users C and D the last five days, or any other combination. In this example, each user may specify the length of their stay within the reservation for the trip item. Each user may then be charged accordingly.

As described above, a trip item may include accommodations, such as a home, apartment, cabin, cottage, and the like. The accommodations for a group trip will typically have more than one bedroom, since the reservation is for a group of people. In one example, the online marketplace may facilitate subdividing an accommodation into one or more bedrooms such that the users can each specify a particular bedroom at the time of booking the accommodations for the group trip.

For example, the online marketplace may store information associated with each room in the listing store 218. Information about each room may include a size of the room (e.g., square footage or relative to the other rooms (e.g., the biggest room, the smallest room, etc.), amenities associated with the room (e.g., bathroom in the room, view from the room, closet, desk or other furniture, kid friendly, etc.), the number and size of the beds in the rooms, whether the room has its own climate control (e.g., air conditioning, heater, fan, etc.), the location of the room in the accommodation (e.g., near the kitchen, to the back of the house, next to the front door, upstairs, downstairs, on the main floor, etc.), whether there is external access to the room, and so forth. The online marketplace may further provide for users to write reviews of the specific room of the accommodation, along with a review of the accommodation itself. In this way a user may determine which room within the accommodations the user would prefer or may work best for the user.

In one example, the cost breakdown for each user in the group may be based on which room the user selects to reserve. For example, there may be a user A, user B, and user C in a group. The accommodations for the group trip may be a house that includes a large master suite with a king size bed and in-room bathroom, a medium sized room next to a full bathroom with a queen size bed, and a medium size room across the hall from the full bathroom with bunk beds. The break down in cost may be based on the size of the room and amenities of the room. For example, the large master suite would cost more than the other rooms, the medium sized room with the queen size bed may cost more than the room with bunk beds, and so forth. The accommodation may be $325 per night. The breakdown cost of the rooms may be $150 a night for the master suite, $100 a night for the medium room with the queen size bed, and $75 a night for the room with the bunk beds. In another example, the cost may be broken down by percentages. For example, the master suite may be 50% of the cost, the medium room with the queen size bed may be 30% of the cost, and the room with the bunk beds may be 20% of the cost.

The cost or break down based on the size and amenities of the room may be determined by the host of the accommodation, the online marketplace (e.g., by scoring the size and each amenity for a total score for each room, determined from data in reviews, etc.), or the users of the group.

In one example, the user that is booking the accommodation may automatically have first choice of rooms. In another example, each user may have a choice of room based on when they respond to the request for authorization to be included in the group trip. In another example, each user may have a choice of room based on the order of payment by each user (e.g., a user who pays first gets first choice, a user who pays second gets second choice, and so forth). In yet another example, there may be no particular order for choice of room.

The following examples describe various embodiments of methods, machine-readable media, and systems (e.g., machines, devices, or other apparatus) discussed herein.

Example 1

A method, comprising:
receiving, by a server computing system from a first computing device associated with a first user, a request to register a group trip comprising at least one trip item, the request including parameters for the group trip, wherein a group associated with the group trip comprises the first user and at least a second user;
sending, by the server computing system, notification to a second computing device associated with the second user for approval to be included in the group trip;
receiving, by the server computing system, authorization from the second computing device to be included in the group trip;
receiving from the first computing device, by the server computing system, a request to book a trip item for the group trip;
analyzing, by the server computing system, the trip item and the parameters related to the group trip to determine whether to approve the request;
approving, by the server computing system, the request to book the trip item for the group trip based on determining that the trip item meets the parameters for the group trip;
automatically charging, by the server computing system, a payment device associated with the first user and a payment device associated with the second user according to the parameters related to the group trip; and
sending, by the server computing system, a confirmation notification to the first computing device and to the second computing device confirming booking of the trip item.

Example 2

The method according to example 1, further comprising:
receiving a cancelation request from the first computing device associated with the first user or the second computing device associated with the second user to cancel the trip item;
analyzing the cancelation policy associated with the trip item to determine whether the trip item may be canceled;
canceling the trip item; and
refunding the amount charged to the first user and the second user based on the parameters for the group trip.

Example 3

A method according to any of the previous examples, wherein before canceling the trip item, the server computing system sends a request to a computing device associated with the user that did not send the cancelation request for approval from the user that did not send the cancelation request and only after receiving approval from computing device associated with the user that did not send the cancelation request does the server computing system cancel the trip item.

Example 4

A method according to any of the previous examples, wherein the group further comprises at least one other user, and the method further comprises:
receiving a cancelation request from the second computing device associated with the second user to cancel a spot reserved for the trip item for only the second user;
analyzing the parameters for the group trip to determine the cancelation policy for the group trip;
determining, that the cancelation policy for the group trip allows the second user to cancel the spot reserved for the trip item for only the second user;
canceling the spot reserved for the trip item only for the second user;
refunding the amount charged the second user; and
automatically charging the first user and the at least one other user for the remaining balance of the trip item based on the parameters for the group trip.

Example 5

A method according to any of the previous examples, wherein parameters related to the group trip include at least one of a group comprising: date range for the trip, maximum amount for a travel service, maximum amount per night, total maximum amount per person for the travel service, maximum amount per person per night, amount of split for cost for each user, minimum number of rooms, and specified amenities for the travel service.

Example 6

A method according to any of the previous examples, further comprising:
verifying the first user to confirm the first user is eligible for a group trip.

Example 7

A method according to any of the previous examples, further comprising:
storing the parameters for the group trip in one or more data stores.

Example 8

A method according to any of the previous examples, wherein the authorization from the second computing device associated with the second user to be include in the group trip comprises a payment device identifier for a payment device to be used for the group trip.

Example 9

A method according to any of the previous examples, wherein the authorization from the second computing device associated with the second user to be include in the group trip comprises an alteration to the parameters for the group trip, and the method further comprises:
sending a request for approval of the alternation to the parameters to the first computing device associated with the first user; and
storing the alteration to the parameters for the group trip based on receiving approval from the first computing device associated with the first user.

Example 10

A method according to any of the previous examples, further comprising:
 verifying the second user as a trustworthy user; and
 sending a notification to the first computing device associated with the first user that the second user has been verified.

Example 11

A server computer comprising:
 at least one processor; and
 a computer-readable medium coupled with the at least one processor, the computer-readable medium comprising instructions stored thereon that are executable by the at least one processor to cause the server computer to perform operations comprising:
  receiving from a first computing device associated with a first user, a request to register a group trip comprising at least one trip item, the request including parameters for the group trip, wherein a group associated with the group trip comprises the first user and at least a second user;
  sending notification to a second computing device associated with the second user for approval to be included in the group trip;
  receiving authorization from the second computing device to be included in the group trip;
  receiving from the first computing device, a request to book a trip item for the group trip;
  analyzing the trip item and the parameters related to the group trip to determine whether to approve the request;
  approving the request to book the trip item for the group trip based on determining that the trip item meets the parameters for the group trip;
  automatically charging a payment device associated with the first user and a payment device associated with the second user according to the parameters related to the group trip; and
  sending a confirmation notification to the first computing device and to the second computing device confirming booking of the trip item.

Example 12

A server computer according to any of the previous examples, the operations further comprising:
 receiving a cancelation request from the first computing device associated with the first user or the second computing device associated with the second user to cancel the trip item;
 analyzing the cancelation policy associated with the trip item to determine whether the trip item may be canceled;
 canceling the trip item; and
 refunding the amount charged to the first user and the second user based on the parameters for the group trip.

Example 13

A server computer according to any of the previous examples, wherein before canceling the trip item, the server computer sends a request to a computing device associated with the user that did not send the cancelation request for approval from the user that did not send the cancelation request and only after receiving approval from computing device associated with the user that did not send the cancelation request does the server computer cancel the trip item.

Example 14

A server computer according to any of the previous examples, wherein the group further comprises at least one other user, and the operations further comprise:
 receiving a cancelation request from the second computing device associated with the second user to cancel a spot reserved for the trip item for only the second user;
 analyzing the parameters for the group trip to determine the cancelation policy for the group trip;
 determining, that the cancelation policy for the group trip allows the second user to cancel the spot reserved for the trip item for only the second user;
 canceling the spot reserved for the trip item only for the second user;
 refunding the amount charged the second user; and
 automatically charging the first user and the at least one other user for the remaining balance of the trip item based on the parameters for the group trip.

Example 15

A server computer according to any of the previous examples, wherein parameters related to the group trip include at least one of a group comprising: date range for the trip, maximum amount for a travel service, maximum amount per night, total maximum amount per person for the travel service, maximum amount per person per night, amount of split for cost for each user, minimum number of rooms, and specified amenities for the travel service.

Example 16

A server computer according to any of the previous examples, the operations further comprising:
 verifying the first user to confirm the first user is eligible for a group trip.

Example 17

A server computer according to any of the previous examples, the operations further comprising:
 storing the parameters for the group trip in one or more data stores.

Example 18

A server computer according to any of the previous examples, wherein the authorization from the second user to be include in the group trip comprises an alteration to the parameters for the group trip, and the method further comprises:
 sending a request for approval of the alternation to the parameters to the first computing device associated with the first user; and
 storing the alteration to the parameters for the group trip based on receiving approval from the first user.

Example 19

A server computer according to any of the previous examples, the operations further comprising:
 verifying the second user as a trustworthy user; and sending a notification to the first computing device associated with the first user that the second user has been verified.

Example 20

A non-transitory computer-readable medium comprising instructions stored thereon that are executable by at least one processor to cause a computing device associated with a first data owner to perform operations comprising:

receiving from a first computing device associated with a first user, a request to register a group trip comprising at least one trip item, the request including parameters for the group trip, wherein a group associated with the group trip comprises the first user and at least a second user;

sending notification to a second computing device associated with the second user for approval to be included in the group trip;

receiving authorization from the second computing device to be included in the group trip;

receiving from the first computing device, a request to book a trip item for the group trip;

analyzing the trip item and the parameters related to the group trip to determine whether to approve the request;

approving the request to book the trip item for the group trip based on determining that the trip item meets the parameters for the group trip;

automatically charging a payment device associated with the first user and a payment device associated with the second user according to the parameters related to the group trip; and sending a confirmation notification to the first computing device and to the second computing device confirming booking of the trip item.

Figure 8:
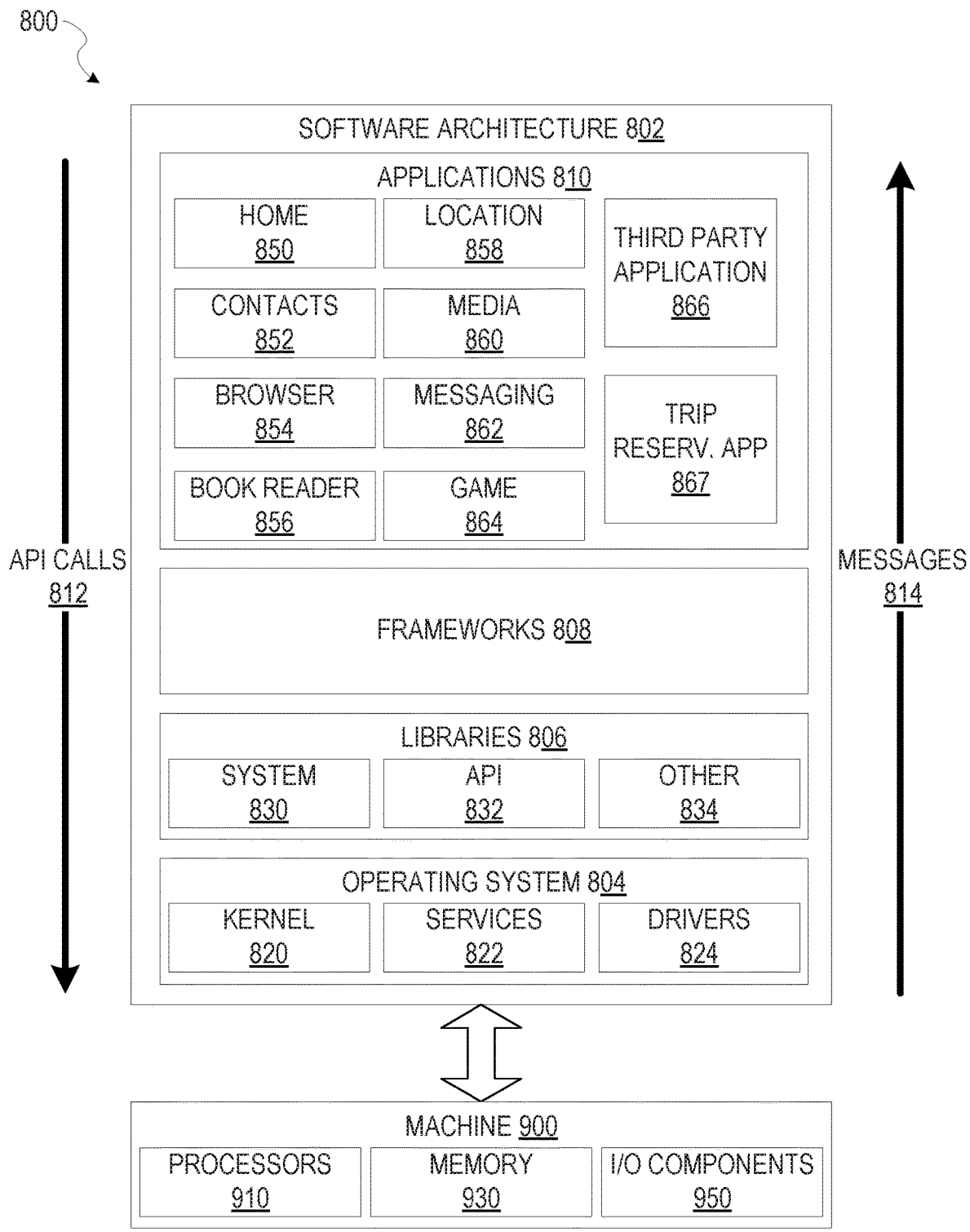
FIG. 8 is a block diagram illustrating an example of a software architecture that may be installed on a machine, according to some example embodiments.

FIG. 8 is a block diagram 800 illustrating software architecture 802, which can be installed on any one or more of the devices described above. For example, in various embodiments, client devices 110 and server systems 130, 102, 120, 122, and 124 may be implemented using some or all of the elements of software architecture 802. FIG. 8 is merely a non-limiting example of a software architecture, and it will be appreciated that many other architectures can be implemented to facilitate the functionality described herein. In various embodiments, the software architecture 802 is implemented by hardware such as machine 900 of FIG. 9 that includes processors 910, memory 930, and input/output (I/O) components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third party applications 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 866 can invoke the API calls 812 provided by the operating system 804 to facilitate functionality described herein.

Some embodiments may particularly include a trip reservation application 867, which may be any application that requests data or other tasks to be performed by systems and servers described herein, such as server system 102, third party servers 130, and so forth. In certain embodiments, this may be a stand-alone application that operates to manage communications with a server system such as third party servers 130 or server system 102. In other embodiments, this functionality may be integrated with another application. The trip reservation application 867 may request and display various data related to an online marketplace and may provide the capability for a user 106 to input data related to the system via voice, a touch interface, a keyboard, or using a camera device of machine 900, communication with a server system via I/O components 950, and receipt and storage of object data in memory 930. Presentation of information and user inputs associated with the information may be managed by trip reservation application 867 using different frameworks 808, library 806 elements, or operating system 804 elements operating on a machine 900.

Figure 9:
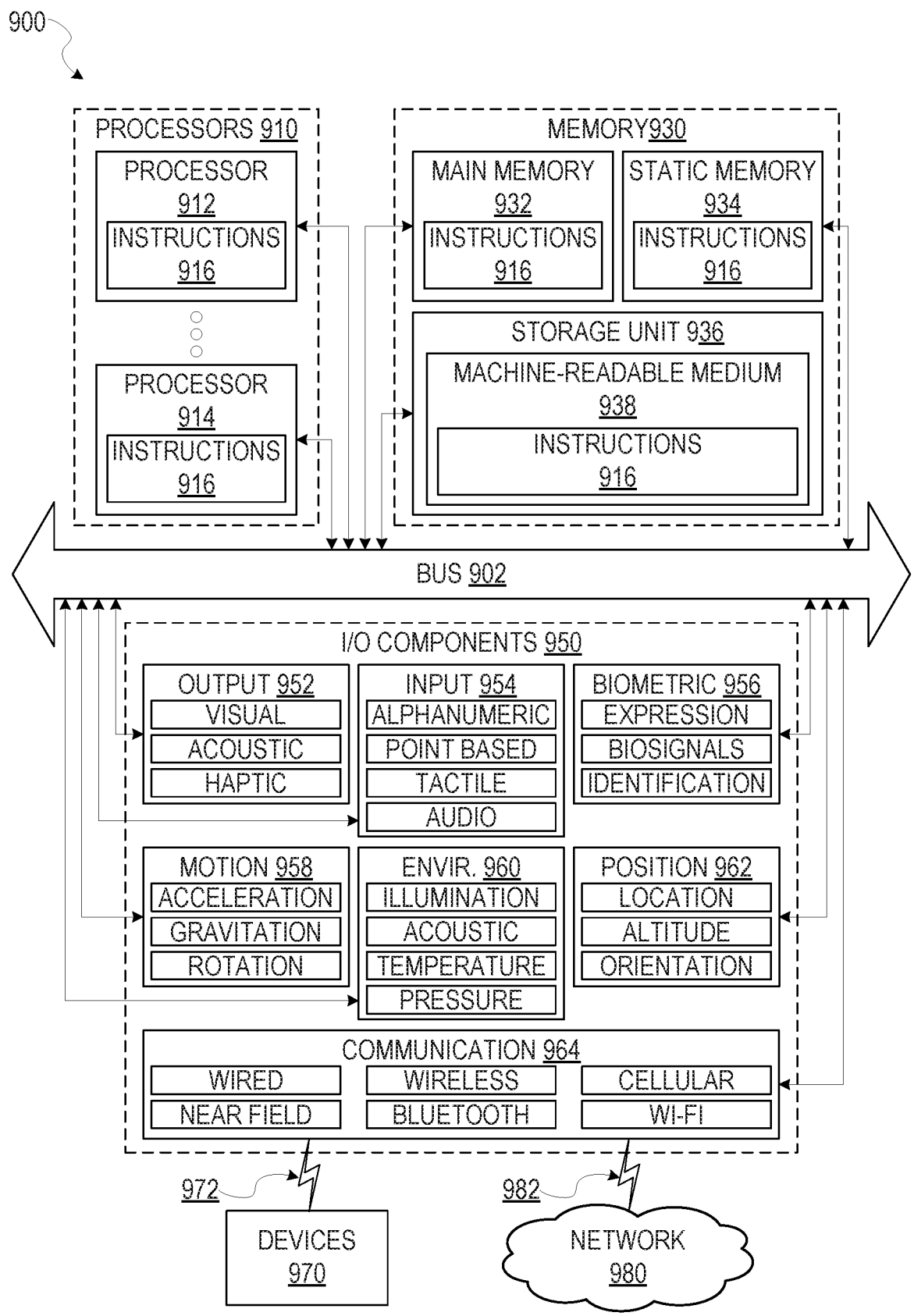
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, 124, 128 and the like, or a client device 90 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 912, 914 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving, by a server computing system in an online marketplace from a first computing device associated with a first user, a search request for accommodations in a given location;
   providing, by the server computing system in the online marketplace to the first computing device, a listing for an accommodation in the given location, the listing comprising an option to request a group trip;
   receiving, by the server computing system in the online marketplace from the first computing device, a request to register a group trip for the accommodation, the request including parameters for the group trip and contact information for a second user to be part of the group trip, the parameters for the group trip comprising a date range for staying in the accommodation, a maximum amount per night, a total maximum amount per user for the accommodation, a maximum amount per user per night, an amount of split cost for each user, a minimum number of rooms in the accommodation, or specified amenities for the accommodation;
   verifying, by the server system in the online marketplace, that the first user is a trustworthy user to determine that the first user is eligible for a group trip based on a verified government issued identification, positive reviews received for the user by a host of a listing for an accommodation in the online marketplace, and a verified payment method in the online marketplace;
   sending, by the server computing system in the online marketplace, notification to a second computing device associated with the received contact information of the second user to request approval to include the second user in the group trip, authorization for a transaction that falls into the parameters for the group trip, and a request for a payment method;
   receiving, by the server computing system in the online marketplace, authorization from the second computing device to be included in the group trip, the authorization comprising information about the second user, payment device information, and an alteration to the parameters for the group trip comprising an alteration to the date range for staying in the accommodation, an alteration to the maximum amount per night, or an alteration to the total maximum amount per user for the accommodation;
   sending, by the server computing system in the online marketplace to the first computing device associated with the first user, a request for approval of the alterations to the parameters for the group trip;
   receiving, by the server computing system in the online marketplace from the first computing device associated with the first user, approval of the alterations to the parameters for the group trip, updating the parameters for the group trip based on the approved alterations, and storing the updated parameters in one or more data stores;
   verifying, by the server computing system in the online marketplace, that the second user is a trustworthy user based on confirming that the second user was previously verified as part of the online marketplace;
   sending, by the server computing system in the online marketplace, a notification to the first computing device associated with the first user that the second user has been verified and has agreed to authorize transactions associated with the group trip;
   receiving from the first computing device, by the server computing system in the online marketplace, a request to book the accommodation for the group trip;
   accessing, by the server system in the online marketplace, the one or more data stores to determine details in the listing for the accommodation and the updated parameters of the group trip, the details in the listing comprising reservation date range for the accommodation, the total cost of the reservation for the accommodation, a number of rooms of the accommodation, and amenities of the accommodation;
   comparing, by the server computing system in the online marketplace, the reservation date range for the accommodation, the total cost of the reservation for the accommodation, the number of rooms of the accommodation, and the amenities of the accommodation to the updated parameters of the group trip to determine whether the details in the listing for the accommodation fall into the updated group parameters;
   based on determining that the details in the listing for the accommodation fall into the updated group parameters, performing operations, in near-real time from receiving the request to book the accommodation for the group trip, the operations comprising:
  approving, by the server computing system in the online marketplace, the request to book the accommodation for the group trip;
  instantaneously charging, by the server computing system in the online marketplace, a payment device associated with the first user and a payment device associated with the second user according to the updated parameters the group trip indicating an amount of split cost for the group trip; and
  sending, by the server computing system in the online marketplace, a confirmation notification to the first computing device and to the second computing device confirming booking of the accommodation; and
based on determining that the details in the listing for the accommodation do not fall into the updated group parameters, denying the request to book the accommodation for the group trip.

2. The method of claim 1, further comprising:
receiving a cancelation request from the first computing device associated with the first user or the second computing device associated with the second user to cancel the accommodation;
analyzing a cancelation policy associated with the accommodation to determine whether the accommodation may be canceled;
canceling the trip item based on determining that the accommodation may be canceled according to the cancelation policy; and
refunding the amount charged to the first user and the second user based on the updated parameters for the group trip.

3. The method of claim 2, wherein before canceling the trip item, the server computing system sends a request to a computing device associated with the user that did not send the cancelation request for approval from the user that did not send the cancelation request and only after receiving approval from computing device associated with the user that did not send the cancelation request does the server computing system cancel the accommodation.

4. The method of claim 1, wherein the group trip further comprises a third user, and the method further comprises:
  receiving a cancelation request from the second computing device associated with the second user to cancel a spot reserved for the trip item for only the second user;
  analyzing the updated parameters for the group trip to determine the cancelation policy for the group trip;
  determining, that the cancelation policy for the group trip allows the second user to cancel the spot reserved for the accommodation for only the second user;
  canceling the spot reserved for the accommodation only for the second user;
  refunding the amount charged the second user; and
  automatically charging the first user and the at third user for the remaining balance of the trip item based on the updated parameters for the group trip.

5. The method of claim 1, further comprising:
storing the parameters for the group trip in one or more data stores.

6. The method of claim 1, wherein the request to register for the group trip further comprises contact information a third user to be part of the group trip, and further comprising:
  receiving authorization from a third computing device associated with the third user to be included in the group trip, the authorization comprising information about the third user, payment device information, and an alteration to the parameters for the group trip comprising an alteration to the amount of split cost for each user;
  sending a request for approval of the alternation to the parameters to the first computing device associated with the first user and the second computing device associated with the second user;
  receiving a denial of the alteration from at least one of the first computing device or the second computing device; and
  based on the received denial, not approving the alteration to the parameters of the group trip.

7. The method of claim 1, further comprising:
verifying the third user as a trustworthy user; and
sending a notification to the first computing device associated with the first user and the second computing device associated with the second user that the third user has been verified.

8. The method of claim 5, wherein the first user is designated to book an accommodation for the group trip and the second user is not designated to book an accommodation for the group trip.

9. The method of claim 5, further comprising:
receiving a request to book a second accommodation for the group trip from the second computing device associated with the second user; and
denying the request based on determining that the second user is not designated to book at accommodation for the group trip.

10. The method of claim 5, wherein denying the request to book the accommodation for the group trip further comprises:
sending a notification to the first computing device associated with the first user indicating that the booking would not meet the updated parameters of the group trip.

11. The method of claim 5, wherein the confirmation notification sent to the first computing device and the second computing device comprises details of the group trip including an itinerary, accommodation details, and host details.

12. The method of claim 5, wherein the parameters of the group trip further comprise the number of group members necessary for the group to constitute being complete.

13. The method of claim 5, wherein the first user and the second user can each add a review of the accommodation after the group trip is complete.

14. A server computer in an online marketplace, comprising:
  at least one processor; and
  a computer-readable medium coupled with the at least one processor, the computer-readable medium comprising instructions stored thereon that are executable by the at least one processor to cause the server computer to perform operations comprising:
    receiving, from a first computing device associated with a first user, a search request for accommodations in a given location;
    providing, to the first computing device, a listing for an accommodation in the given location, the listing comprising an option to request a group trip;
    receiving, from the first computing device, a request to register a group trip for the accommodation, the request including parameters for the group trip and contact information for a second user to be part of the group trip, the parameters for the group trip comprising a date range for staying in the accommodation, a maximum amount per night, a total maximum amount per user for the accommodation, a maximum amount per user per night, an amount of split cost for each user, a minimum number of rooms in the accommodation, or specified amenities for the accommodation;

verifying that the first user is a trustworthy user to determine that the first user is eligible for a group trip based on a verified government issued identification, positive reviews received for the user by a host of a listing for an accommodation in the online marketplace, and a verified payment method in the online marketplace;

sending notification to a second computing device associated with the received contact information of the second user to request approval to include the second user in the group trip, authorization for a transaction that falls into the parameters for the group trip, and a request for a payment method;

receiving authorization from the second computing device to be included in the group trip, the authorization comprising information about the second user, payment device information, and an alteration to the parameters for the group trip comprising an alteration to the date range for staying in the accommodation, an alteration to the maximum amount per night, or an alteration to the total maximum amount per user for the accommodation;

sending, to the first computing device associated with the first user, a request for approval of the alterations to the parameters for the group trip;

receiving, from the first computing device associated with the first user, approval of the alterations to the parameters for the group trip, updating the parameters for the group trip based on the approved alterations, and storing the updated parameters in one or more data stores;

verifying that the second user is a trustworthy user based on confirming that the second user was previously verified as part of the online marketplace;

sending a notification to the first computing device associated with the first user that the second user has been verified and has agreed to authorize transactions associated with the group trip;

receiving from the first computing device, a request to book the accommodation for the group trip;

accessing the one or more data stores to determine details in the listing for the accommodation and the updated parameters of the group trip, the details in the listing comprising reservation date range for the accommodation, the total cost of the reservation for the accommodation, a number of rooms of the accommodation, and amenities of the accommodation;

comparing the reservation date range for the accommodation, the total cost of the reservation for the accommodation, the number of rooms of the accommodation, and the amenities of the accommodation to the updated parameters of the group trip to determine whether the details in the listing for the accommodation fall into the updated group parameters;

based on determining that the details in the listing for the accommodation fall into the updated group parameters, performing operations comprising:
 approving the request to book the accommodation for the group trip;
 instantaneously charging a payment device associated with the first user and a payment device associated with the second user according to the updated parameters the group trip indicating an amount of split cost for the group trip; and
 sending a confirmation notification to the first computing device and to the second computing device confirming booking of the accommodation; and based on determining that the details in the listing for the accommodation do not fall into the updated group parameters, denying the request to book the accommodation for the group trip.

15. The server computer of claim 14, the operations further comprising:
 receiving a cancelation request from the first computing device associated with the first user or the second computing device associated with the second user to cancel the accommodation;
 analyzing a cancelation policy associated with the accommodation to determine whether the accommodation may be canceled;
 canceling the trip item based on determining that the accommodation may be canceled according to the cancelation policy; and
 refunding the amount charged to the first user and the second user based on the updated parameters for the group trip.

16. The server computer of claim 15, wherein before canceling the trip item, the server computing system sends a request to a computing device associated with the user that did not send the cancelation request for approval from the user that did not send the cancelation request and only after receiving approval from computing device associated with the user that did not send the cancelation request does the server computing system cancel the accommodation.

17. The server computer of claim 14, wherein the group trip further comprises a third user, and the method further comprises:
 receiving a cancelation request from the second computing device associated with the second user to cancel a spot reserved for the trip item for only the second user;
 analyzing the updated parameters for the group trip to determine the cancelation policy for the group trip;
 determining, that the cancelation policy for the group trip allows the second user to cancel the spot reserved for the accommodation for only the second user;
 canceling the spot reserved for the accommodation only for the second user;
 refunding the amount charged the second user; and
 automatically charging the first user and the at third user for the remaining balance of the trip item based on the updated parameters for the group trip.

18. The server computer of claim 14, the operations further comprising:
 storing the parameters for the group trip in one or more data stores.

19. The server computer of claim 14, the operations further comprising:
 verifying the third user as a trustworthy user; and
 sending a notification to the first computing device associated with the first user and the second computing device associated with the second user that the third user has been verified.

20. A non-transitory computer-readable medium comprising instructions stored thereon that are executable by at least one processor to cause a computing device associated with a first data owner to perform operations comprising:

receiving, from a first computing device associated with a first user, a search request for accommodations in a given location;

providing, to the first computing device, a listing for an accommodation in the given location, the listing comprising an option to request a group trip;

receiving, from the first computing device, a request to register a group trip for the accommodation, the request including parameters for the group trip and contact information for a second user to be part of the group trip, the parameters for the group trip comprising a date range for staying in the accommodation, a maximum amount per night, a total maximum amount per user for the accommodation, a maximum amount per user per night, an amount of split cost for each user, a minimum number of rooms in the accommodation, or specified amenities for the accommodation;

verifying that the first user is a trustworthy user to determine that the first user is eligible for a group trip based on a verified government issued identification, positive reviews received for the user by a host of a listing for an accommodation in the online marketplace, and a verified payment method in the online marketplace;

sending notification to a second computing device associated with the received contact information of the second user to request approval to include the second user in the group trip, authorization for a transaction that falls into the parameters for the group trip, and a request for a payment method;

receiving authorization from the second computing device to be included in the group trip, the authorization comprising information about the second user, payment device information, and an alteration to the parameters for the group trip comprising an alteration to the date range for staying in the accommodation, an alteration to the maximum amount per night, or an alteration to the total maximum amount per user for the accommodation;

sending, to the first computing device associated with the first user, a request for approval of the alterations to the parameters for the group trip;

receiving, from the first computing device associated with the first user, approval of the alterations to the parameters for the group trip, updating the parameters for the group trip based on the approved alterations, and storing the updated parameters in one or more data stores;

verifying that the second user is a trustworthy user based on confirming that the second user was previously verified as part of the online marketplace;

sending a notification to the first computing device associated with the first user that the second user has been verified and has agreed to authorize transactions associated with the group trip;

receiving from the first computing device, a request to book the accommodation for the group trip;

accessing the one or more data stores to determine details in the listing for the accommodation and the updated parameters of the group trip, the details in the listing comprising reservation date range for the accommodation, the total cost of the reservation for the accommodation, a number of rooms of the accommodation, and amenities of the accommodation;

comparing the reservation date range for the accommodation, the total cost of the reservation for the accommodation, the number of rooms of the accommodation, and the amenities of the accommodation to the updated parameters of the group trip to determine whether the details in the listing for the accommodation fall into the updated group parameters;

based on determining that the details in the listing for the accommodation fall into the updated group parameters, performing operations comprising:
  approving the request to book the accommodation for the group trip;
  instantaneously charging a payment device associated with the first user and a payment device associated with the second user according to the updated parameters the group trip indicating an amount of split cost for the group trip; and
  sending a confirmation notification to the first computing device and to the second computing device confirming booking of the accommodation; and based on determining that the details in the listing for the accommodation do not fall into the updated group parameters, denying the request to book the accommodation for the group trip.

* * * * *